(12) United States Patent
Benkreira et al.

(10) Patent No.: US 12,488,629 B2
(45) Date of Patent: Dec. 2, 2025

(54) SYSTEMS AND TECHNIQUES TO AUTOMATICALLY MAINTAIN ACCURATE VEHICLE SERVICE EVENTS FOR VEHICLES

(71) Applicant: Capital One Services, LLC, McLean, VA (US)

(72) Inventors: Abdelkader M'Hamed Benkreira, Washington, DC (US); Tyler Maiman, Melville, NY (US); Brendan Way, Brooklyn, NY (US)

(73) Assignee: Capital One Services, LLC., McLean, VA (US)

( * ) Notice: Subject to any disclaimer, the term of this patent is extended or adjusted under 35 U.S.C. 154(b) by 485 days.

(21) Appl. No.: 17/326,701

(22) Filed: May 21, 2021

(65) Prior Publication Data
US 2022/0375271 A1    Nov. 24, 2022

(51) Int. Cl.
*G06Q 10/20*    (2023.01)
*G07C 5/00*    (2006.01)

(52) U.S. Cl.
CPC ............ *G07C 5/006* (2013.01); *G06Q 10/20* (2013.01); *G07C 5/008* (2013.01)

(58) Field of Classification Search
CPC ........ G07C 5/006; G07C 5/008; G06Q 10/20; H04L 67/02
See application file for complete search history.

(56) References Cited

U.S. PATENT DOCUMENTS

| 8,175,908 | B1 | 5/2012 | Anderson | |
| 2003/0114967 | A1* | 6/2003 | Good | G08G 1/20 |
| | | | | 701/29.3 |
| 2004/0203974 | A1* | 10/2004 | Seibel | G07C 5/008 |
| | | | | 455/414.1 |
| 2006/0114531 | A1* | 6/2006 | Webb | G01N 21/8851 |
| | | | | 359/15 |
| 2006/0178793 | A1* | 8/2006 | Hecklinger | G06Q 10/10 |
| | | | | 701/1 |
| 2015/0332284 | A1* | 11/2015 | Unser | G06Q 30/0201 |
| | | | | 705/7.29 |
| 2016/0321726 | A1* | 11/2016 | Singh | G06Q 40/03 |
| 2016/0350726 | A1* | 12/2016 | Lee | G06Q 10/20 |
| 2018/0121862 | A1* | 5/2018 | Garry | G06Q 10/20 |
| 2020/0242677 | A1* | 7/2020 | Popli | G06Q 30/0621 |
| 2022/0229833 | A1* | 7/2022 | Muzik | G06F 21/31 |

OTHER PUBLICATIONS

Kleinschmidt, Uwe. "Setting Up Service Intervals in your POS system," [online] published on Dec. 31, 2014, available at: <https://help.autovitals.com/setting-up-service-intervals-in-your-pos-system/ > (Year: 2014).*

Zhu et al., Creating a Real-Time License Plate Detection and Recognition App, Nvidia Developer [online], available at: <https://developer.nvidia.com/blog/creating-a-real-time-license-plate-detection-and-recognition-app/ > Published on Feb. 25, 2021 ( Year: 2021).*

* cited by examiner

Primary Examiner — Richard W. Crandall
(74) Attorney, Agent, or Firm — KDW FIRM PLLC

(57) ABSTRACT

Embodiments are generally directed systems, devices, methods, and techniques to detect vehicle service events in transactions, and to store the vehicle service events in a data store.

18 Claims, 7 Drawing Sheets

SYSTEMS AND TECHNIQUES TO AUTOMATICALLY MAINTAIN ACCURATE VEHICLE SERVICE EVENTS FOR VEHICLES

BACKGROUND

Maintenance and repair of a vehicle is a general concern to an owner or operator of a vehicle. Cost of labor and components, downtime, productivity, performance, and efficiency, among other factors, all impact the ability of a vehicle to perform as it is designed. Accordingly, it is critical to perform timely servicing of the vehicles and maintain accurate records. Today, service is typically performed based on the vehicle's mileage and by following the manufacturer's recommendations for maintenance. The current state of the art is to manually record when parts are replaced relative to the vehicle's mileage, which is time-consuming and requires input from several individuals, including drivers, mechanics and parts distributors. Thus, accurate record-keeping is rarely maintained, resulting in servicing performed outside of the manufacturers' specified recommendations and causes unnecessary wear and tear.

Moreover, accurate record-keeping is essential when selling and buying used vehicles to ensure that a vehicle is adequately serviced and price accurately. Thus, there is a need for a system to accurately record maintenance and services performed on vehicles with minimal impact on vehicle owners, mechanics, and parts distributors. Embodiments discussed herein address these and other issues.

BRIEF SUMMARY

Embodiments may be generally directed to systems and techniques to detect vehicle service events in transaction data. For example, embodiments may include a system to detect vehicle service events in transaction data, comprising one or more networking interfaces, a data store configured to store the vehicle service events for vehicles, one or more processors coupled with the data store and the one or more networking interfaces. The memory comprising instructions that, when executed by the one or more processors, cause the processor to receive, via the one or more networking interfaces, transaction data corresponding to a transaction for a good, a service, or combination thereof, determine, for the transaction using the transaction data, a set of candidate vehicle service events from a set of vehicle service events, and send, via the one or more networking interfaces, a first communication to a device associated with the transaction, the first communication comprising the set of candidate vehicle service events. The one or more processors may be also configured to receive, via the one or more networking interfaces, a second communication from the device, the second communication comprising an indication of a vehicle service event from the set of candidate vehicle service events, determine an identifier to identify a vehicle from the transaction data corresponding to the transaction, and store, in the data store, the vehicle service event and the transaction data associated with the identifier.

Embodiments may also include a computer-implemented method, comprising processing transaction data for a transaction, the transaction data associated with an account enrolled in vehicle service event monitoring, determining, from the transaction data, the transaction is for a good, a service, or a combination relating to one a plurality of vehicle service events, and determining, from the transaction data, candidate vehicle service events from the plurality of vehicle service events. The method may also include determining, from the transaction data, a device associated with the transaction, sending a first communication message to the device, the first communication comprising the candidate vehicle service events, receiving a second communication message from the device, the second communication comprising an indication of a vehicle service event from the candidate vehicle service events, determining, from the transaction data, an identifier to identify a vehicle corresponding to the transaction, and storing, in a data store, the vehicle service event and the transaction data associated with the identifier.

Embodiments may also include a system configured to detect and store vehicle service events associated with transactions, comprising one or more networking interfaces, a data store configured to store the vehicle service events for vehicles, and one or more processors coupled with the data store and the one or more networking interfaces. The memory may include instructions that, when executed by the one or more processors, cause the processor to process an enrollment request to enroll a customer to monitor transactions for vehicle service events, the enrollment request comprising an identifier associated with a vehicle, and at least one account number associated with the customer, store, in a data store, an indication to monitor accounts for each of the one or more account numbers, and set a monitoring routine to analyze transaction data for each of the one or more accounts to detect vehicle service events for the vehicle.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
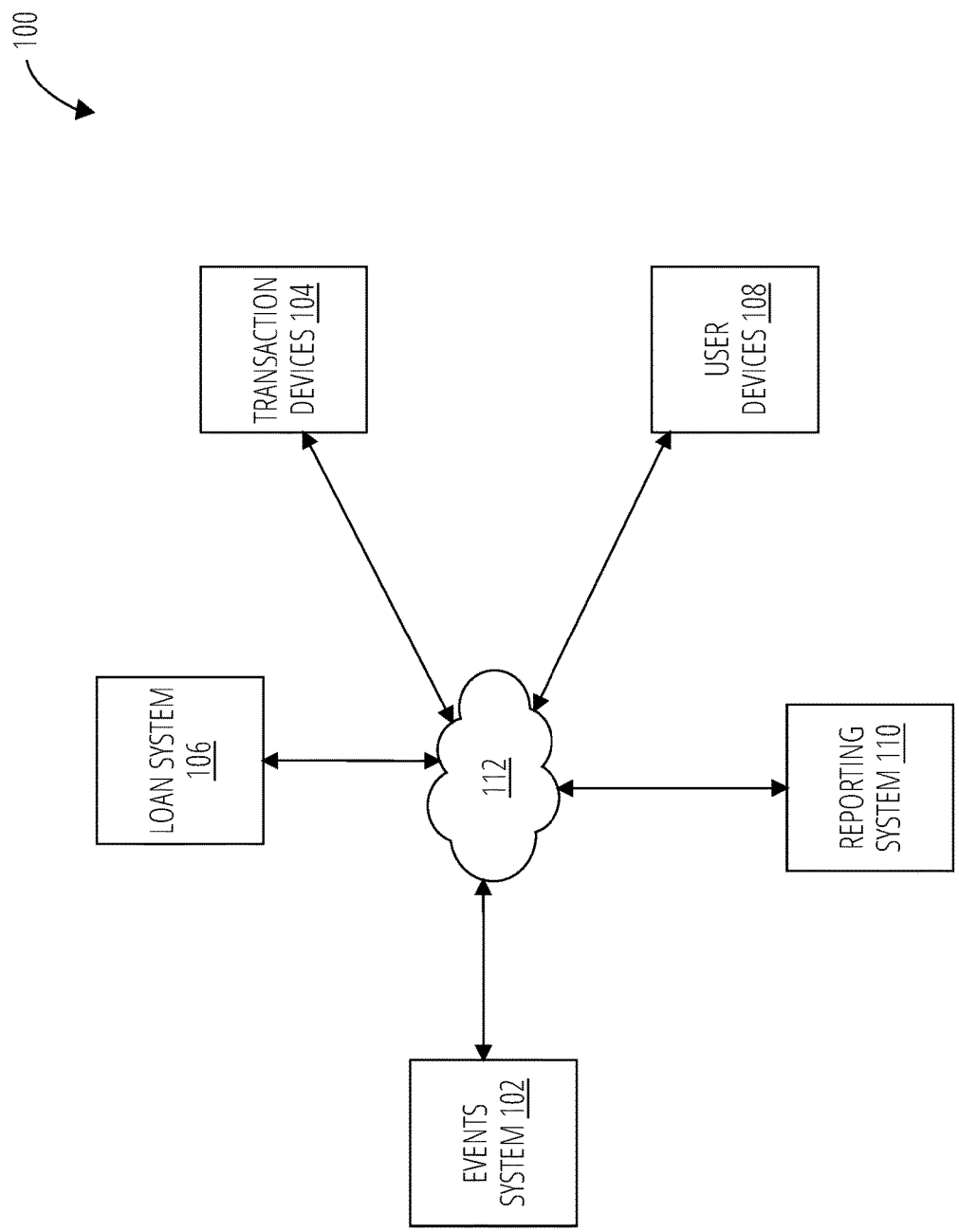
FIG. 1 illustrates an example of a system 100 in accordance with embodiments.

Embodiments may be generally directed to processing data streams for transactions performed with payment instruments to detect transactions relating to services and parts purchased to maintain vehicles. The system further includes analyzing the data to make predictions of the services performed on the vehicles and the parts used to perform the services. For example, the system may include analyzing transaction data against a pool of data, including known vehicle service events to determine candidate vehicle service events that a customer or a service provider may confirm for the transaction. In some embodiments, the set of candidate vehicle service events may be generated by the system by applying a trained model to the transaction data, and the model may return a result including one or more candidate vehicle service events for the particular transaction. The result may be a list of most likely vehicle service events for the particular transaction, which the customer or the service provider may confirm.

In embodiments, the system may be further configured to store vehicle service records, including the vehicle service events for the vehicles based on the transaction. For example, the system may determine and confirm a vehicle service event for a particular transaction and store data associated with the transaction in a database associated with a particular vehicle. The system may include and/or be coupled with a data store having a database that stores vehicle service events for the vehicles. As will be discussed in more detail below, each vehicle may be associated with a unique identifier to identify the vehicle (e.g., a vehicle identification number (VIN)) and one or more account identifiers. Thus, transactions on a particular account may be associated with a particular vehicle. When a vehicle service event is detected or performed with a particular account, the system may store the event in the database and associated with the particular vehicle. The system may maintain vehicle service event records for a particular vehicle, which the customer may use to keep track of their service records. The system may also enable third-party reporting services to request data and provide the data to the third-party reporting services.

Embodiments discussed herein provide improvements over traditional systems by correlating transaction data with vehicle services events to maintain service records for customers. The system may apply filtering techniques, analytic techniques, and/or machine-learning techniques to make predictions for vehicle service events so that a customer or service provider may more easily specify and/or confirm a particular service and/or parts. Moreover, the systems and techniques provide practical applications to customers, service providers, and third-party reporting services. For example, the system may be configured to send service reminders to customer devices based on vehicle service events detected and stored in the system. The system may also be configured to provide the service records to the customer through a mobile application, such as a banking application, on a mobile device. In a third example, the system may be configured to process requests and provide service records to third-party report services, such as Carfax®, AutoCheck®, Kelly BlueBook®, and so forth. Additional details are described further below.

FIG. 1 illustrates an example system 100 configured to monitor and detect vehicle service events for vehicles and store data associated with the vehicle service events. In embodiments, the system 100 may be configured to enable a number of systems and devices to communicate and exchange data in accordance with the embodiments discussed herein (e.g., via network 112). The network 112 may include wired and wireless networking hardware and software configured to communicate data between the systems and devices. In one example, the network 112 may be the Internet (World Wide Web). In embodiments, the systems and devices may include hardware and software to perform the operations discussed herein. The systems may include an events system 102, a loan system 106, and a reporting system 110, and the devices may include transaction devices 104 and user devices 108.

In embodiments, the events system 102 may include computing hardware, such as servers, computers, workstations, networking equipment, memory, and data stores, as discussed in more detail below in FIG. 2, etc. The events system 102, including the hardware and software, may be configured to monitor transactions, detect vehicle services events, and store maintenance records for customers. In some embodiments, the events system 102 is configured to enroll customers to monitor transactions. Once a specific customer is enrolled, the events system 102 may monitor one or more accounts associated with the customer for the transactions corresponding to the vehicle service events. Specifically, the events system 102 may analyze each transaction and determine whether a particular transaction is for a vehicle service event based on the transaction data for the transaction (e.g., location, merchant, description, etc.). The events system 102 may detect any type of service, part, or resource purchased for a vehicle based on the transaction data. A vehicle service event may include services like an oil change, tire replacement, battery replacement, new spark plugs, new windshield wipers, new brakes, or any other type of maintenance or repair performed on a vehicle. Repairs may include any service required to repair a damaged part of the vehicles, such as scratches, dents, damage from an accident, and so forth. Vehicle service events may also include parts purchased for a vehicle (e.g., oil, brake pads, rotors, wiper blades, battery, lights, belts, etc.). Other examples may include resources purchased for a vehicle (e.g., gas, windshield washer fluid, etc.). Embodiments are not limited to these examples.

In embodiments, the events system 102 may be coupled with one or more transaction devices 104 via network 112 and receive transaction data for transactions to analyze for events. The transaction devices 104 may include any type of transaction device, including point-of-sale (POS) terminals, online merchant systems, and so forth. In embodiments, a transaction device 104 may include one or more processors and circuitry, memory/storage, interfaces, and input/output (I/O) devices. The one or more processors may process data and the memory may store instructions to be processed by the one or more processors. In some instances, a transaction device 104 may include one or more card readers, such as a Europay, Mastercard, Visa (EMV) chip reader, card stripe reader, Near-Field Communication (NFC) reader, etc., configured to read and write data to a contactless card, such as credit or checking cards. The transaction devices 104 may also include a number pad and/or touchscreen interface for customers to input data, interfaces (wired or wireless) to communicate data via network 112, and a display to present data to customers.

In instances discussed herein, the transaction devices 104 may be part of a vehicle service center system, a car dealership system, an auto parts merchant system, an auto body repair shop system, and so forth. The transaction devices 104 may process transactions for vehicle service events, which may include any type of work or service performed on a vehicle, including the parts and labor. The transaction devices 104 may include information, such as a merchant code to identify the merchant, a price or cost of the service/parts, and the merchant/service location in the transaction data. The transaction data may also include a date/time the transaction occurred, which may be used as a rough approximation of when the service was performed. The transaction data may include other data, such as at least an account number associated with a payment instrument, the name of the customer, a card verification value (CVV), an expiration of the payment instrument, and so forth. In some instances, the transaction data may include more detailed information, including a description of the service performed and/or the parts purchased. The transaction devices 104 may provide the transaction data to a banking system to process a transaction for the event. The events system 102, which may be part of the banking system, may determine if the account or customer for the transaction is enrolled in monitoring and if the event is for a vehicle.

As mentioned above, the events system 102 may monitor and store data for enrolled customers, e.g., have opted into vehicle service event monitoring. In one example, the customer may request to enroll their vehicle and accounts for monitor when the vehicle is being purchased and/or the customer is applying for a loan for the vehicle. In embodiments, the events system 102 may be coupled with a loan system 106 and receive data from the loan system 106 to enroll the customer and their vehicle. The loan system 106 may be part of the banking system and configured to process loan applications, including auto loans. As part of the loan application process, the customer may be prompted if they would like to enroll in a monitoring service for their vehicle to detect vehicle service events and keep maintenance records. In one example, an electronic loan application form may include an option selectable by the customer to enroll in the monitoring service. The loan system 106 may process the customer's request to enroll and indicate the customer is enrolled in the events system 102. In another example, the loan system 106 may receive a loan application and communicate a separate message to a user device associated with the customer. The message may ask the customer if they wish to enroll in the service and to provide a response, e.g., a reply message. The response may be provided to the events system 102

The loan system 106 may include computing devices, such as servers including processors, memory/storage, interfaces, I/O devices, etc., and is configured to provide data to the events system 102 to enroll the customer into the vehicle service events monitoring using the data from the loan application. The data may include the customer's name, loan account number, customer's address, customer's phone number, and other customer information. The data may also include information relating to the vehicle, such as a vehicle identification number (VIN), vehicle make and model, vehicle model, vehicle trim package/engine type, and so forth. In data may also include account number(s) for the account(s) associated with the customer to monitor (e.g., account(s) that can be used to perform transactions.

In some embodiments, the events system 102 may determine the customer's account number(s) to monitor for the vehicle service events. For example, the events system 102 may process the customer's name, address, phone number, social security number (SSN), and so forth to look up additional banking accounts the customer has open, e.g., checking accounts, savings account, credit accounts, and so forth. In some instances, the additional banking accounts may be with the same bank (e.g., the bank providing an auto loan). However, in other instances, the additional banking accounts and the auto loan may be provided by different banks; and embodiments are not limited in this manner.

In embodiments, the events system 102 may enable customers to request to enroll in the monitor service via other techniques (e.g., directly through a web interface or a mobile application). For example, a customer may utilize a user device 108 to enroll and monitor their service records. A user device 108 may include a mobile phone device, a mobile computing device, a personal computer, etc. The user device 108 may include an application (app), such as a banking app, configured to enable users to enroll. The banking app may provide one or more graphical user interface (GUI) menus, including fields to enter the data to enroll. For example, a GUI menu may include fields to enter vehicle data, e.g., the VIN, a make/model, year, trim/engine package, and so forth. In another example, the banking app may enable the customer to take a picture or image of information and collect data to enroll the customer. The customer may select to enroll via the banking app, and the banking app may initiate the camera of a mobile device to take an image. The banking app may prompt the customer to take an image of an article having data on the card (e.g., the vehicle's registration card, the vehicle's VIN plate, the vehicle's license plate, etc.). The banking app with the system 100 may utilize the information to determine additional information about the vehicle. In one example, the user device 108, including the banking app, may perform an optical character recognition (OCR) technique to determine the VIN number and other information in the image. Other information may include the vehicle make/model, year, etc. The information may be sent by the user device 108 to the events system 102 to enroll the customer. In some instances, the banking app may send the image to another system, e.g., events system 102, to perform the OCR technique to determine the information and enroll the customer.

In some instances, the user device 108 and banking app or the events system 102 may have to use the information in the image to look up additional information on the vehicle. For example, if the customer takes a picture of the VIN plate, the user device 108 or events system 102 may perform a lookup in a database, such as one maintained by a department of motor vehicles (DMV), a vehicle service center, a car dealership, or other records database, to determine additional information about the vehicle, (e.g., the make model, year, etc.).

The banking app may also be configured to collect and store other data associated with the customer. For example, the banking app may be configured with the customer's name, address, phone number, and other personal information. The banking app may also be linked and/or include data associated with banking accounts owned by the customer. Further, the banking app may be configured to provide additional banking services, such as checking account balances, transferring money, paying bills, applying for new accounts, managing personal information, and so forth.

In embodiments, a user device 108, including the banking app, may provide additional maintenance services for the customer. For example, the banking app may be configured with one or more GUI displays that enable the customer to view their service events or records. For example, a display may include a listing of each vehicle enrolled in monitoring and configured to enable a customer to select the vehicle. The banking app may be configured to communicate a request to the events system 102 to retrieve the data corresponding to a selected vehicle. The events system 102 may provide the requested data to the user device 108 and display the data in a GUI display. The banking app may also be configured for the user to interact with the data, including making updates to the data, deleting incorrect data, and adding data.

The banking app may also provide a customer with notifications or reminders based on the service records in embodiments. For example, the events system 102 may be configured to determine when future service events are required, e.g., the next oil change, and provide an alert to the customer via the banking app. The events system 102 may send a message to the banking app to cause a prompt to display the customer's user device 108, for example. In embodiments, events system 102 may send the message wherein the second date is a number of days (or other specified time period) before the due date of the future service event allow the customer time to schedule the service. The message may be communicated to the banking app through an application programming interface (API) communication. In some instances, the events system 102 may send the message through other communication techniques (e.g., via a text message, and embodiments are not limited in this manner).

In embodiments, the events system 102 may also be configured to communicate and operate with a reporting system 110. The reporting system 110 may be a third-party vehicle history reporting system operated by a reporting agency, such as Carfax®, AutoCheck®, Kelly BlueBook®, and so forth. For example, the events system 102 may receive a request for data for a particular vehicle. The request may include an identifier, such as the vehicle's VIN, and the events system 102 may retrieve the data and provide the data to the reporting system 110. In some instances, the reporting system 110 may request data for a plurality of vehicles in a batch request. The batch request may include identifiers (VINs) for each of the vehicles or specify other criteria such as all vehicles of a specific type, within a specified timeframe, and so forth. The events system 102 may return the data corresponding to the batch request. In some embodiments, the third-party vehicle history reporting agency may pay for the data, e.g., per vehicle, per request, based on the amount of data, etc. Embodiments are not limited in this manner.

In embodiments, the events system 102 may include one or more services configured to perform the operations discussed herein and to process data from the transaction devices 104, the loan system 106, the user devices 108, and the reporting system 110. FIG. 2 illustrates a more detailed view of the events system 102.

Figure 2:
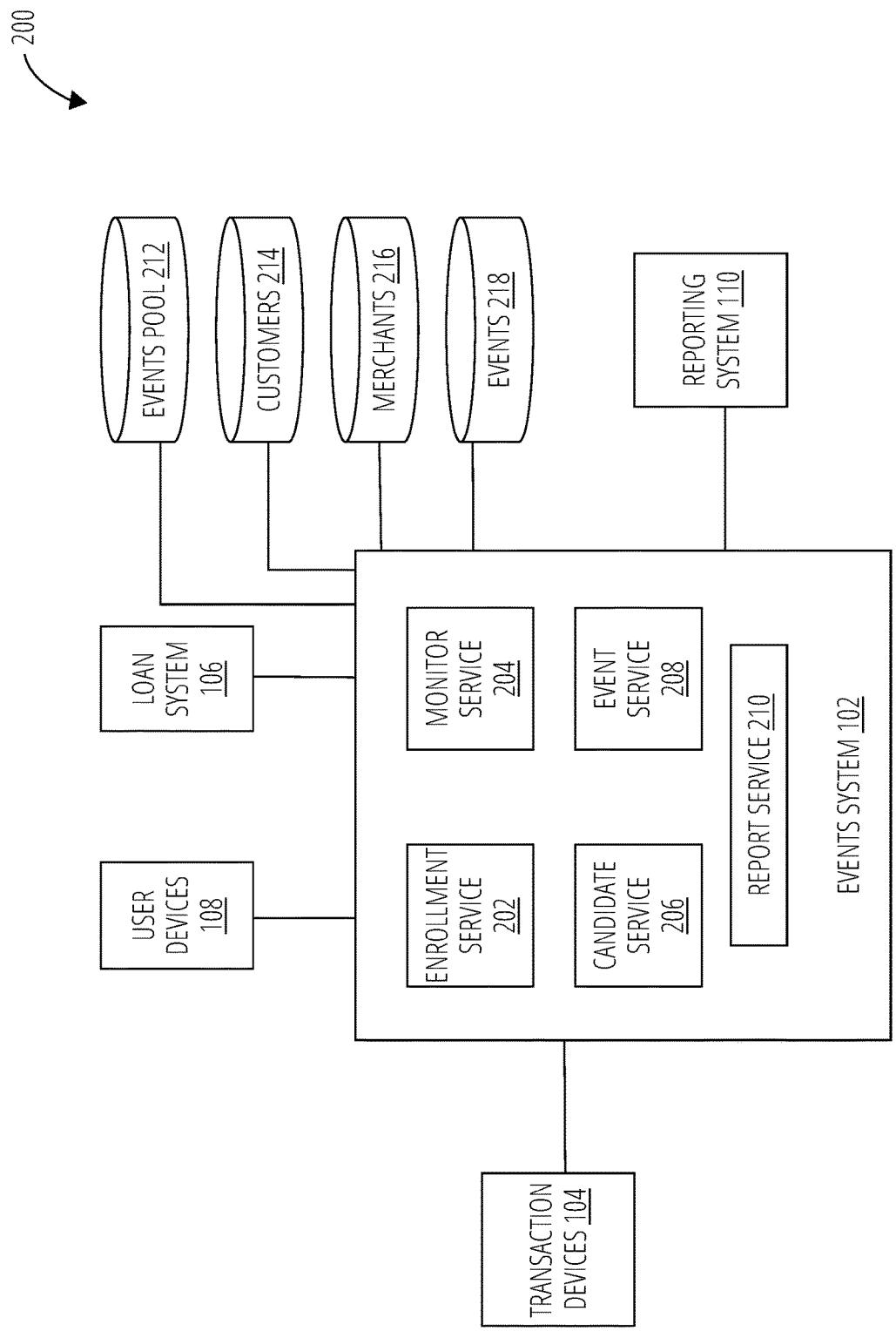
FIG. 2 illustrates an example of a system 200 in accordance with embodiments.

FIG. 2 illustrates an example of a system 200, which may be the same as system 100, and includes a more detailed view of the events system 102. In embodiments, the events system 102 may include computer hardware and software, including one or more servers, and components such as processors, memory, storage, interfaces, I/O devices, displays, etc. The components may be configured to execute computing instructions to perform the operations and services discussed herein. In the illustrated example, the events system 102 includes an enrollment service 202, a monitor service 204, a candidate service 206, and an event service 208 to perform the operations discussed herein, including enrolling customers into a monitoring service for their vehicles, monitoring transaction data to detect vehicle service events, determine possible candidates for detected events, and providing reporting services to customers and third-party vehicle history services. The events system 102 may also be coupled with one or more data stores configured to store data to perform the operations discussed herein. In the illustrated example system 200, the events system 102 is coupled with an events pool data store 212, a customers data store 214, a merchants data store 216, and an events data store 218. Each of the data stores may be stored in local or remote storage devices, such as a cloud-based storage system; embodiments are not limited in this manner. For example, embodiments may include implementing one or more of the data stores as a cloud-based data store. Further, each of the data stores may be stored at the same location or different locations, and embodiments are not limited in this manner.

In embodiments, the events system 102, including the enrollment service 202, may perform enrollment operations or processes to enroll customers into the monitoring services to detect vehicle service events. The enrollment service 202 may include one or more processes configured to execute on the events system 102 to process data from a loan system 106 or user device 108 to enroll a customer in the system. For example, the loan system 106 may send an indication to the events system 102, including the enrollment service 202, providing an API including data to enroll the customer. The data may include the customer's name or identifier, vehicle information (e.g., VIN, make/model, year, etc.), and so forth. In some instances, the loan system 106 may include account data identifying one or more accounts the customer may have and to couple with a vehicle and to monitor. Alternatively, the enrollment service 202 may receive the same information from a customer via a banking app on a user device 108 to enroll.

In some embodiments, the enrollment service 202 may process a enrollment request and the data to enroll and configure the monitor service 204 to monitor specific accounts (e.g., savings account, checking account, credit account, etc.) for transactions. The accounts may be provided by the loan system 106 or via user devices 108 in some instances. However, in other instances, the enrollment service 202 may determine accounts associated with the customer. For example, the enrollment service 202 may use the data (e.g., customer name, address, phone number, SSN, etc.) to determine accounts for the customer by performing a lookup in a data store, such as the customers data store 214. The customers data store 214 may store data for each customer including the customer's name, phone number, address, etc., and associated with each account number for the customer's accounts.

The enrollment service 202 may configure the system 200 to monitor each of the accounts associated with the customer for transactions to determine if a particular transaction is associated with a vehicle service event. For example, the enrollment service 202 may send data or indication through an API to the monitor service 204 to monitor each account or account number associated with a particular customer enrolled in the system.

In embodiments, the events system 102 including the monitor service 204 may be configured to monitor transactions on each account for each customer enrolled in the monitoring service. For example, the monitor service 204 may receive transaction data from a banking system as a result of the banking system processing a transaction or directly from a transaction device 104. The monitor service 204 may compare information (e.g., an account number) in the transaction data to information in a data store (e.g., the customers data store 214) to determine if the customer is enrolled in the monitoring service. The customers data store 214 may include an indication for each account number associated with a customer enrolled in the system. If a transaction occurs for an account enrolled in the monitoring service, the monitor service 204 may determine if the transaction is associated with a vehicle event service.

Specifically, the monitor service 204 may determine if a specific transaction is for a vehicle service event or for another good or service. In one example, the transaction data may include a merchant code, and the monitor service 204 may compare the merchant code against data in the merchants data store 216. The merchants data store 216 may include a listing of merchants and merchant codes that are known to provide vehicle service events, e.g., maintenance services, parts, etc. In another example, the monitor service 204 may determine a specific transaction for a vehicle service event based on a description or name in the transaction data. For example, the monitor service 204 may apply data mining techniques and compare one or more of the terms in the description to known vehicle service event terms. For example, the description may include "oil service," and the monitor service 204 may determine the "oil service" is a vehicle service event based on the term "oil" matching a term in the events pool data store 212.

In embodiments, the events pool data store 212 may store a library of every possible event or service that may be performed on vehicles. Thus, the events pool data store 212 may be the global database for the possible events or services that may be performed. Each event or service may be stored in the events pool data store 212 and include associated data. For example, an event may have a label or name, a unique identifier, a description, and a price or price range. In some embodiments, each event may be associated with other events in the events pool data store 212.

In embodiments, the events system 102 also includes a candidate service 206 that may be used to generate a list or set of candidate vehicle service events based on the transaction data. The candidate service 206 may be initiated when the monitor service 204 determines that a transaction is associated with a vehicle service event to determine the specific vehicle service event. The candidate service 206 may process the transaction data and use the events pool data store 212 to narrow the possible candidates that may be confirmed by the customer and/or the merchant. In one example, the candidate service 206 may use the price in the transaction data as a proxy to determine one or more candidate vehicle service events. The candidate service 206 may return a number (e.g., five) of candidate events having the closest price to the transaction indicated in the transaction data. In some instances, the candidate service 206 may filter or determine the candidate events based on more than just price. For example, the candidate service 206 may filter on the price and a specific merchant using the merchant code in the transaction data. Other data may also be used to further narrow the set of candidate events, e.g., the transaction location, the date/time of the transaction, the description of the transaction, and so forth. Embodiments are not limited in this manner.

In some embodiments, the events system 102 may include one or more models that may be used to predict the candidate events based on transaction data. Specifically, a model is trained on historical transaction data for historical transactions relating to services and parts purchased for vehicles. To determine a set of candidate vehicle service events, the candidate service 206 may process the real-time transaction through the trained model. The trained model may return a result that includes a number of candidate events and a probability the transaction is the candidate event. For example, a customer may perform a transaction with an oil service center. The transaction data may include the merchant code for the oil service center, a price for the transaction, a location, a date/time, etc. The candidate service 206 may apply a trained model to the transaction data, and the result may include candidate vehicle service events and probabilities for each event, e.g., 60% chance the event is an oil change, 42% change the event is a brake replacement, and 15% chance the event is a tire replacement.

In some instances, the candidate service 206 may send a message to a device associated with the customer or a merchant to confirm at least one of the candidate service events is the actual event performed. For example, the candidate service 206 may send a text message to a mobile device associated with the customer, including a list of each of the set of the candidate vehicle service events. The customer, via the mobile device, may respond to the text message, including a selection of at least one of the candidate events. In some instances, the set of candidate vehicle service events may be incorrect or not include the service event performed. In these instances, the customer may respond via a text message with the correct service event performed. The text message and response may be in any format, including a short message service (SMS) format, a multimedia message service (MMS) format, Extensible Messaging and Presence Protocol (XMPP) format, a real-time communication (RTC) format, etc., and operate in accordance with the appropriate protocol.

In some instances, the candidate service 206 may send a message to a device associated with the merchant to confirm the vehicle service event. For example, the candidate service 206 may be configured to send a message through an API to a transaction device 104 or POS terminal. The message may include the set of candidate vehicle service events determined by the candidate service 206. The merchant may confirm one or more of the service events from the candidate service events via a response message. Alternatively, the merchant may input a service event if the actual service event is not listed as a candidate service event. In some instances, the messages may be communicated in accordance with one of the messaging protocols, e.g., SMS, MMS, RTC, etc.

In some embodiments, the candidate service 206 may not require the customer or merchant to confirm a candidate service event but may determine the vehicle service event based on the filter or machine-learning result. For example, the candidate service 206 may determine the most likely (e.g., having the highest probability or closest price) vehicle service event based on the transaction data. Embodiments are not limited in this manner.

In embodiments, the events system 102 may include an event service 208 configured to process the vehicle service events and store the events in a data store, such as the events data store 218. For example, the event service 208 may process the result or response of the text message and store the selected vehicle service event in the events data store 218. In another example, the event service 208 may store the result determined by the 206 (e.g., the vehicle service event with the highest probability or closest price).

In embodiments, the events data store 218 may include a database configured to store events for vehicles. The database may be configured to store each vehicle service event for each vehicle. Each vehicle may be stored in the database by an identifier, such as the VIN. For example, a database entry for a vehicle service event may include the VIN, vehicle service event identifier, a description, a customer identifier, and a price (or a price range). The event service 208 may make an entry for each detection based on a transaction performed. In a specific example, a customer may have a vehicle identified by a VIN 1234 and make purchases using a monitored credit card account. For a first transaction using the credit card account to perform an oil change, the events system 102 may detect the transaction as a service event, determine candidate service events, and the customer may confirm the service, e.g., an oil change. The event service 208 may enter the events data store 218 for the vehicle, including the VIN 1234, oil change, description: changed oil with 5W30 synthetic oil, and customer identifier. A second transaction may be detected by the events system 102 for a replacement of tires. The event service 208 may generate a second entry in the data for the vehicle, including the VIN 1234, tire replacement, description: replaced tires with size XYZ, and the customer identifier.

The event service 208 may generate an entry for each transaction relating to a vehicle service event for the vehicle in the events data store 218.

In embodiments, the events system 102 may enable customers via user devices and third-party systems to request data and provide the data. The events system 102 may include a report service 210 to process requests for data, retrieve the requested data from the events data store 218, and send the data to a device associated with the request. For example, the report service 210 may receive a request for the vehicle service events associated with a vehicle from a device associated with a customer. The request may be generated by the customer via the banking app on the customer's mobile device and communicated to the report service 210 via an API communication. The request may include information to identify the vehicle, e.g., the VIN, that may be used to perform a lookup n the events data store 218. The report service 210 may verify the customer and/or the device associated with the customer via a verification technique, retrieve the data from the events data store 218, and communicate the data to the device for display in a GUI of the banking app.

In another example, a third-party service may pay for the vehicle service event data to provide to other people as part of a reporting service. For example, a person may wish to purchase a vehicle and use a third-party vehicle history report service, such as Carfax®, to determine the vehicle history of the potential car to purchase. The third-party service system may also request the data using a vehicle's VIN, and the report service 210 may provide the results from the events data store 218. In some instances, potential buyers may request the data from the events system 102 and the report service 210 directly, bypassing a third-party vehicle history report service. For example, an app, such as the banking app, can be configured to receive and process requests for data. The buyer may enter a VIN via a GUI interface in a mobile device. The mobile device may send the request to the events system 102, and the events system 102 may return results, which may be displayed to the buyer. Embodiments are not limited in this manner.

In embodiments, the events system 102 may provide additional services based on the transaction data and the data stored in the one or more data stores. For example, the events system 102 may execute one or more services to predict when the next routine service is likely to be required. The events system 102 may store a reminder for the next service in the events data store 218, which may trigger a reminder message to be sent to a device associated with the customer at some predetermined amount of time before the predicted next service. In one example, the events system 102 may use historical and/or previous routine service events (e.g., periodic oil changes) to determine when a next service event is to occur. The events system 102 may average the amount of time between each routine service event. In one specific example, if historically a customer performs an oil change every three months, the events system 102 may detect an oil change on a date and set a reminder in the events data store 218 that the next oil change is likely to happen three months from the date. The customer may set a configuration for a reminder message to be sent to a device two weeks before the three-month date. Embodiments are not limited to this example, and similar analytics can be applied to other service events, such as tire rotation, fill washer fluid, buy new tires, etc. Further, the predicted time can be updated by the events system 102 when more data is collected to account for changes in the customer's behavior patterns (e.g., a new job may require a person to drive more and increase the frequency of oil changes).

In some embodiments, the events system 102 may utilize machine-learning to determine to predict when a next routine service event is likely to occur. For example, the events system 102 may train on historical transaction data and events to make future predictions. In some embodiments, the events system 102 may train models for each of the customers (e.g., each customer may have a specifically trained model). In other instances, the events system 102 may train a model using a global set of data collected across all of the customers. The events system 102 may also have different models for different routine service events (e.g., oil changes, tire rotation, tire replacement, etc.). Embodiments are not limited in this manner.

Figure 3:
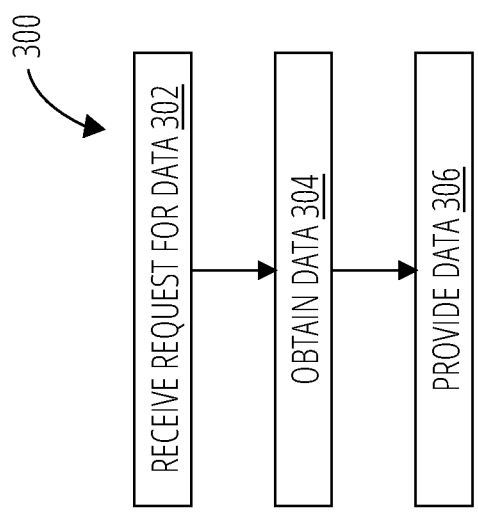
FIG. 3 illustrates an example of a routine 300 in accordance with embodiments.

FIG. 3 illustrates an example of a routine 300 that may be performed by an events system 102 to process a request for data. At block 302, the routine 300 includes receiving a request for data. In one example, the events system 102 may receive a request from a mobile app executing on a user device or customer device. The request is for service records for a vehicle and may include an identifier (e.g., a VIN) to identify the vehicle. The request may include additional information, a customer identifier, an account identifier, a specified time range (e.g., January-July), and so forth. The request may also include identifiers for more than one vehicle. For example, a customer may have two or more vehicles, and the request may include an associated VIN for each of the vehicles. In some instances, the events system 102 may receive the request from another system, such as a third-party vehicle history reporting system.

At block 304, the routine 300 includes obtaining the data for the request. For example, the events system 102 may retrieve the data from a data store, such as the events data store 218, based on the information in the request (e.g., the VIN, a customer identifier, an account identifier, etc.). In some instances, the events system 102 may obtain the data within the specified time range for a particular vehicle.

At block 306, the 300 includes providing the data to the device or system requesting the data. For example, the events system 102 may send data, including the obtained vehicle service events, to the customer device or a third-party system. In embodiments, the data may be communicated over a communication channel. In one example, the data may be requested through an API get request and may be returned in response to the request (e.g., a GET command). However, embodiments are not limited in this manner, and other client/server communication techniques may be utilized for the events system 102 to process requests and provide data to devices/systems.

Figure 4:
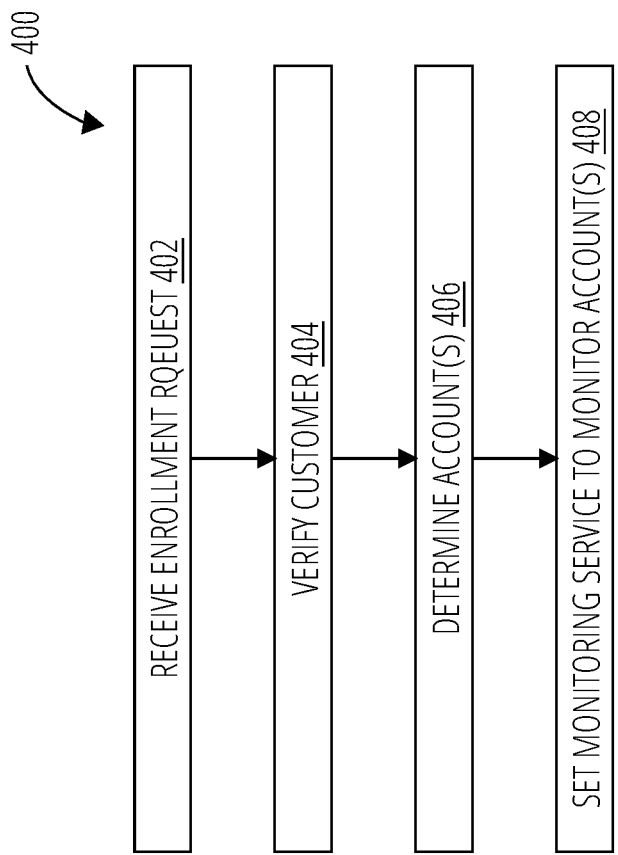
FIG. 4 illustrates an example of a routine 400 in accordance with embodiments.

FIG. 4 illustrates an example of a routine 400 that may be performed to enroll a customer to monitor for vehicle service events and store associated data. In embodiments, the operations of routine 400 may be performed by one or more servers of an events system 102.

At block 402, the routine 400 includes receiving an enrollment request. For example, the events system 102 may receive an enrollment request based on a loan application (e.g., from a loan system 106) for the purchase of the vehicle. Performing an enrollment process for the customer during the loan application may be a convenient way for the customer to enroll in the monitoring server at the time of purchase. Thus, the customer can be ensured that they will have a complete and accurate list of maintenance records for their vehicle while they own it. The customer may use the records to increase a sale price if they ever decide to sell the vehicle by showing that they have maintained the vehicle in accordance with the vehicle maintenance schedule, for example.

Embodiments also support enrollment at any point in time. For example, a customer may utilize their banking app to request to enroll their vehicle and accounts in monitoring. In this example, the events system 102 may receive the request from a banking app executing on the customer device, mobile device, personal computer, etc.

At block 404, the routine 400 includes verifying the customer. For example, the events system 102 may verify the customer by performing a verification process. In one example, events system 102 may have the customer verify themselves by providing a piece of information known to the events system 102. In some instances, the events system 102 may perform a two-factor verification process to verify the customer. Embodiments are not limited in this manner.

At block 406, the routine 400 includes determining one or more accounts associated with the customer. For example, the events system 102 may use the information provided in the loan application or through the banking app to determine one or more banking accounts owned and managed by the customer. The information may include the name of the customer, the address of the customer, the phone number of the customer, a social security number (SSN) of the customer, or any combination thereof.

At block 408, the routine 400 includes setting a monitoring routine or service to monitor the accounts associated with a customer for vehicle service events. For example, the events system 102 may set a flag or setting in a data store that causes the events system 102 to analyze transaction data each time a transaction is performed with one of the accounts. The events system 102 may monitor to determine if a particular transaction is related to a vehicle service event, as previously discussed and discussed in more detail in FIG. 5.

Figure 5:
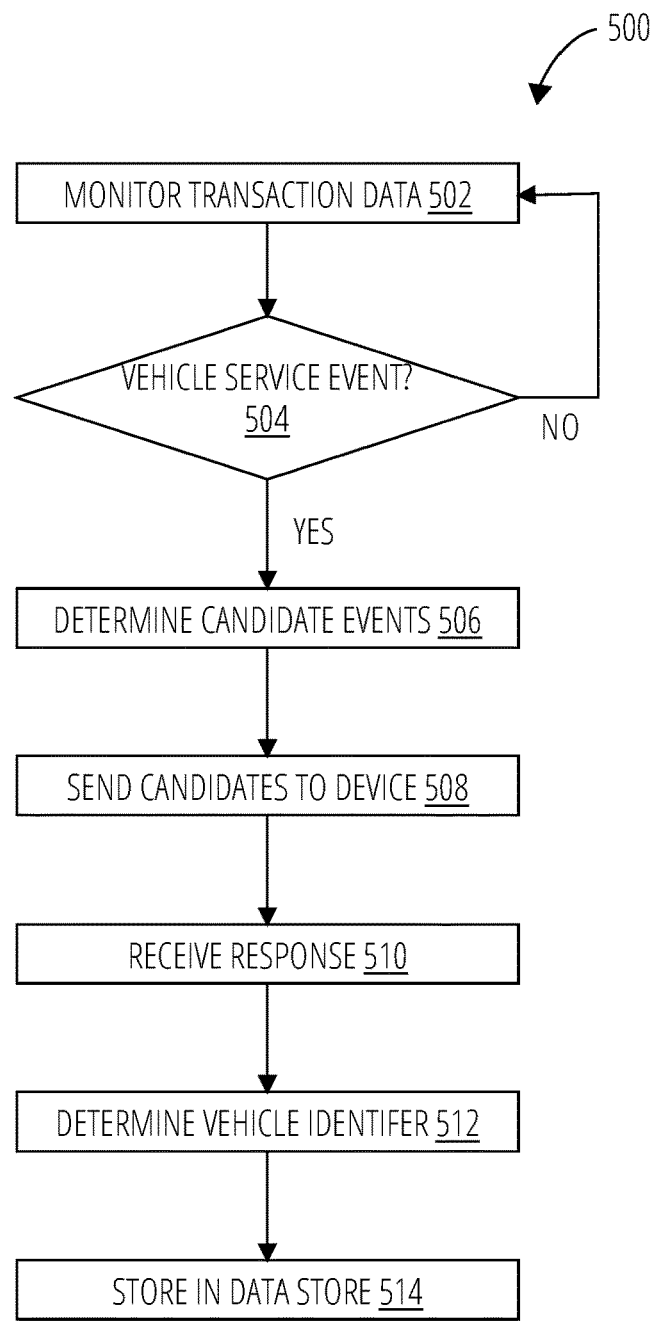
FIG. 5 illustrates an example of a routine 500 in accordance with embodiments.

FIG. 5 illustrates an example of a routine 500 that may be performed by an events system 102 to detect transactions for vehicle service events and store data relating to the events in a data store.

At block 502, the routine 500 includes monitoring and receiving transaction data corresponding to a transaction for a monitored account. And at decision block 504, the routine 500 determines whether the transaction data is for a transaction for a vehicle service event. For example, the events system 102 may determine the transaction data corresponds to a service event based on a merchant code in the data, a description in the data, etc. If the transaction data does not correspond to the service event, the events system 102 may continue to monitor the account for new transaction data.

If the transaction data corresponds to a service event, the routine 500 includes determining candidate vehicle service events for the transaction data at block 506. The candidate service events may be the most likely service events for the transaction data. The candidates may be determined based on one or more filtering techniques (e.g., based on the price, merchant, location, etc.). In other instances, the candidates may be determined by applying machine-learning techniques (e.g., a trained model) to the transaction data.

At block 508, the routine 500 includes communicating the candidate vehicle service events to a device. In some instances, the candidates may be communicated to a customer device (e.g., a mobile device) via a text message or through a banking app. The customer may then confirm one or more of the candidates as the actual service event(s) performed or provide the correct service event if it's not listed as a candidate. In some instances, the events system 102 may communicate the candidates to a device associated with a merchant, and the merchant may confirm the vehicle service event(s) performed. At block 510, the routine 500 includes receiving and processing a response from the device. For example, the events system 102 may process the selected candidate or provided service event. Note that the operations in block 508 and block 510 may be optional and not performed by the routine 500. For example, the routine 500 may include determining the vehicle service event without having the customer or merchant verify the event (e.g., based on the result of the filtering or machine-learning technique).

At block 512, the routine 500 includes determining a vehicle associated with the transaction. For example, the events system 102 may perform a lookup in a data store to determine vehicle(s) associated with the account used to perform the transaction. In some instances, if more than one vehicle is associated with the account, the events system 102 may request the customer via customer device to confirm which vehicle the transaction is by sending a message and receiving a response.

At block 514, the routine 500 includes storing data associated with the vehicle service event in a data store. For example, the events system 102 may make an entry in a database using the VIN of the vehicle to store the vehicle service event, including a name of the event, a description of the event, a price/cost, account information, and any other information that may be related to the event.

Figure 6:
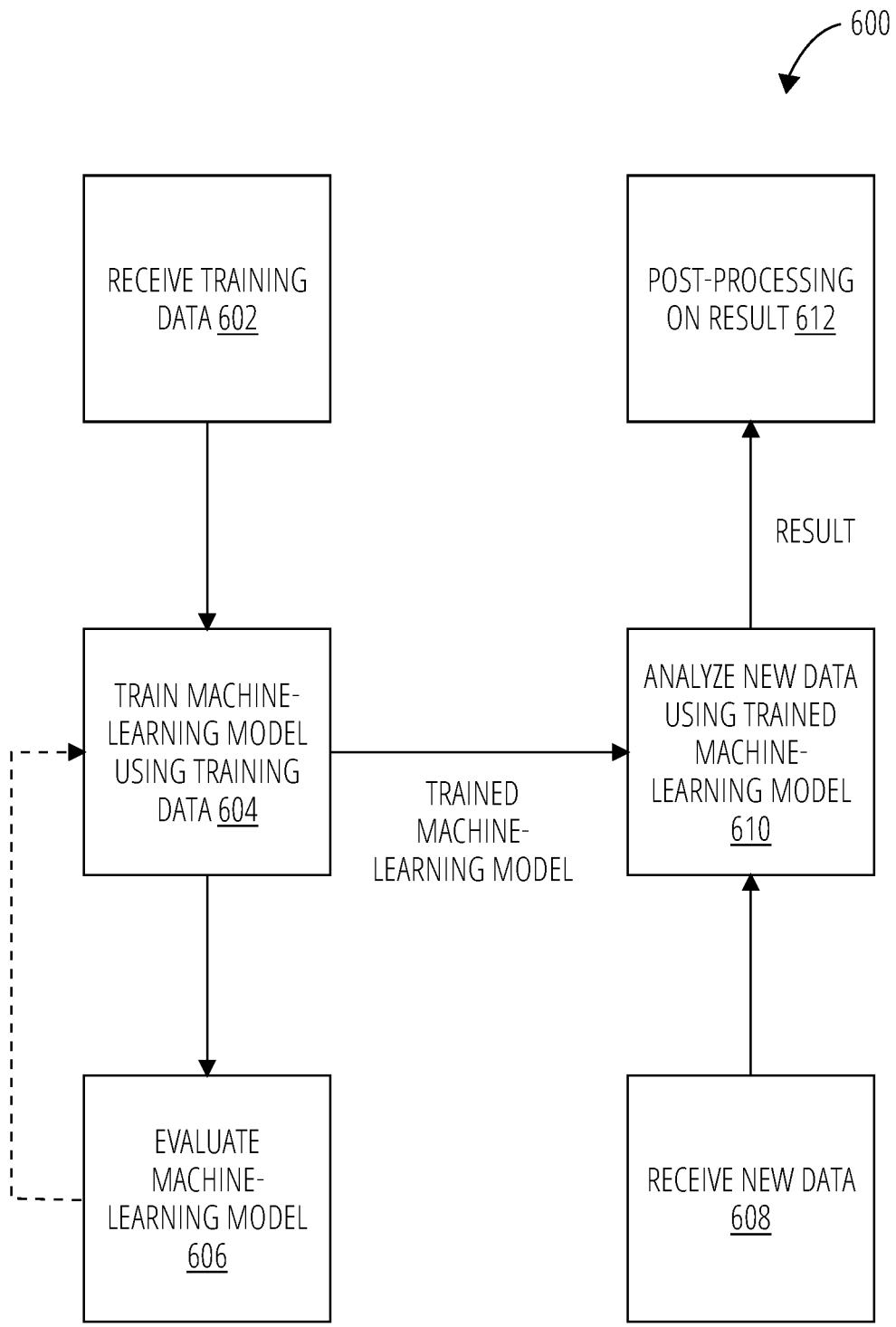
FIG. 6 illustrates an example of a process 600 to perform machine-learning operations.

FIG. 6 is a flow chart of an example of a process 600 for generating and using a machine-learning model according to some aspects discussed herein (e.g., determining candidate vehicle service events or predict future service events). Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Machine-learning models can be constructed through an at least partially automated (e.g., with little or no human involvement) process called training, as previously discussed. During training, input data, such as the historical transaction data can be iteratively supplied to a machine-learning model to enable the machine-learning model to identify patterns related to the input data or to identify relationships between the input data and output data. As discussed, embodiments include utilizing supervised and/or unsupervised training. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. The training may also incorporate a clustering technique to cluster or classify data into groups, e.g., customers with similar profiles (e.g., vehicles, spending habits, frequency of routine maintenance etc.), and/or transactions with similar profiles (e.g., merchant codes, locations, price(s), etc.).

In block 602, training data is received. In some examples, the training data is received from a remote database or a local database (data stores), constructed from various subsets of data, e.g., transaction data. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model. In embodiments, the training data may include historical data based on data previously collected. The historical data may also include the profile of the previous collected data. This information may be used to train the models to predict candidate vehicle events and/or future maintenance events, for example. Embodiments are not limited in this manner.

In block 604, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure. This may enable the machine-learning model to learn a mapping between the inputs and desired outputs. In unsupervised training, the training data includes inputs, but not desired outputs, so that the machine-learning model must find structure in the inputs on its own. In semi-supervised training, only some of the inputs in the training data are correlated to desired outputs.

In block 606, the machine-learning model is evaluated. For example, an evaluation dataset can be obtained, for example, via user input or from a database or datastore. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 406, where the machine-learning model can be further trained using additional training data or otherwise modified to improve accuracy. If the machine-learning model has an adequate degree of accuracy for the particular task, (e.g., predict candidate vehicle service events), the process can continue to block 608.

In block 608, new data is received. In some examples, the new data is received from one or more transaction devices 104, as previously discussed. The new data may be unknown to the machine-learning model. For example, the machine-learning model may not have previously processed or analyzed the new data. The new data may include information about transactions, for example.

In block 610, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 612, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 7:
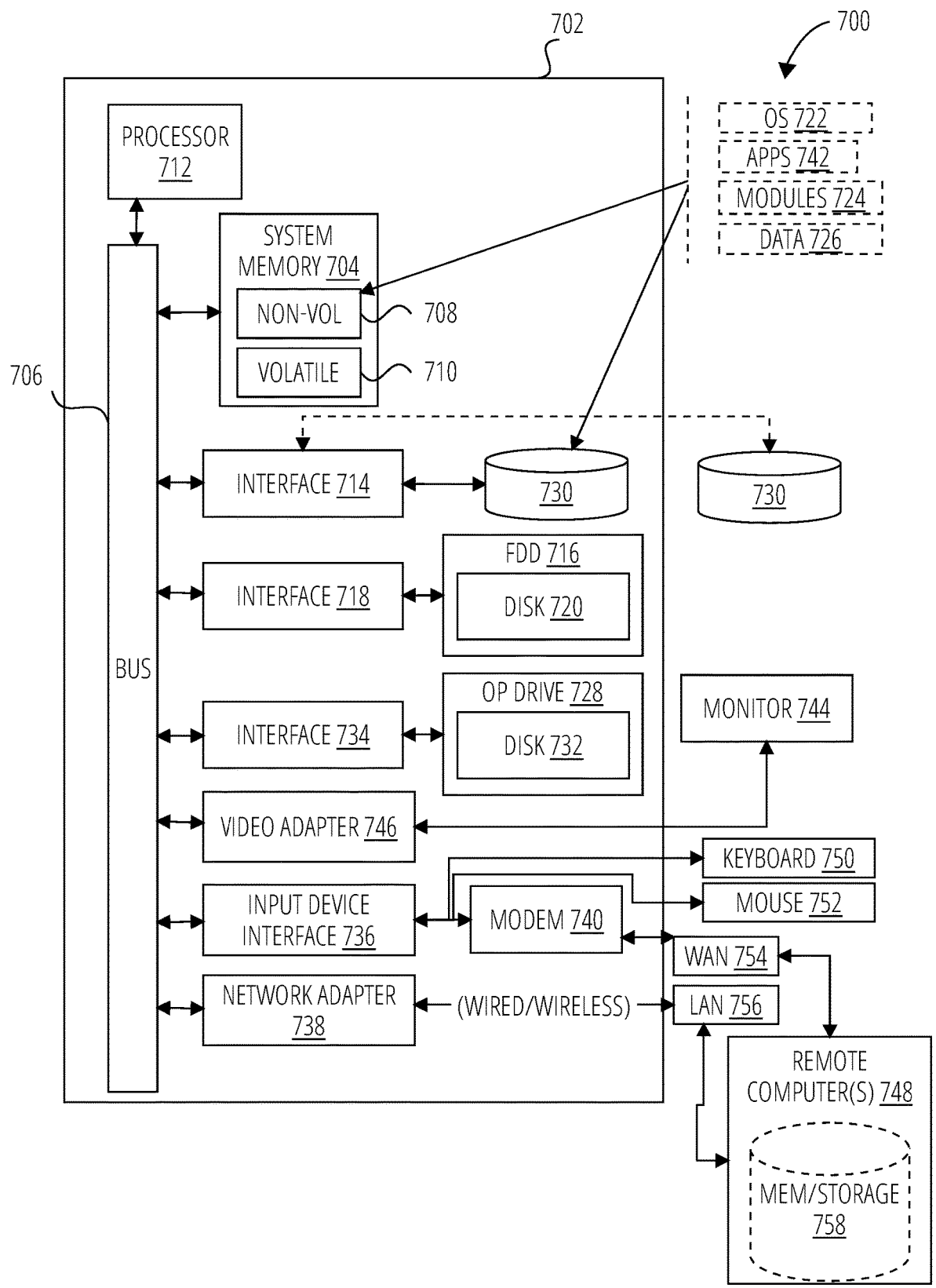
FIG. 7 illustrates a computer architecture 700 in accordance with one embodiment.

FIG. 7 illustrates an embodiment of an exemplary computer architecture 700 suitable for implementing various embodiments as previously described. In one embodiment, the computer architecture 700 may include or be implemented as part of one or more systems or devices discussed herein.

As used in this application, the terms "system" and "component" are intended to refer to a computer-related entity, either hardware, a combination of hardware and software, software, or software in execution, examples of which are provided by the exemplary computing computer architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computer architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 100.

As shown in FIG. 7, the computer architecture 700 includes a processor 712, a system memory 704 and a system bus 706. The processor 712 can be any of various commercially available processors.

The system bus 706 provides an interface for system components including, but not limited to, the system memory 704 to the processor 712. The system bus 706 can be any of several types of bus structure that may further interconnect to a memory bus (with or without a memory controller), a peripheral bus, and a local bus using any of a variety of commercially available bus architectures. Interface adapters may connect to the system bus 708 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computer architecture 700 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 704 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 704 can include non-volatile 708 and/or volatile 710. A basic input/output system (BIOS) can be stored in the non-volatile 708.

The computer 702 may include various types of computer-readable storage media in the form of one or more lower speed memory units, including an internal (or external) hard disk drive 730, a magnetic disk drive 716 to read from or write to a removable magnetic disk 720, and an optical disk drive 728 to read from or write to a removable optical disk 732 (e.g., a CD-ROM or DVD). The hard disk drive 730, magnetic disk drive 716 and optical disk drive 728 can be connected to system bus 706 the by an HDD interface 714, and FDD interface 718 and an optical disk drive interface 734, respectively. The HDD interface 714 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and non-volatile 708, and volatile 710, including an operating system 722, one or more applications 742, other program modules 724, and program data 726. In one embodiment, the one or more applications 742, other program modules 724, and program data 726 can include, for example, the various applications and/or components of the systems discussed herein.

A user can enter commands and information into the computer 702 through one or more wire/wireless input devices, for example, a keyboard 750 and a pointing device, such as a mouse 752. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processor 712 through an input device interface 736 that is coupled to the system bus 706 but can be connected by other interfaces such as a parallel port, IEEE 1394 serial port, a game port, a USB port, an IR interface, and so forth.

A monitor 744 or other type of display device is also connected to the system bus 706 via an interface, such as a video adapter 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer(s) 748. The remote computer(s) 748 can be a workstation, a server computer, a router, a personal computer, portable computer, microprocessor-based entertainment appliance, a peer device or other common network node, and typically includes many or all the elements described relative to the computer 702, although, for purposes of brevity, only a memory and/or storage device 758 is illustrated. The logical connections depicted include wire/wireless connectivity to a local area network 756 and/or larger networks, for example, a wide area network 754. Such LAN and WAN networking environments are commonplace in offices and companies, and facilitate enterprise-wide computer networks, such as intranets, all of which may connect to a global communications network, for example, the Internet.

When used in a local area network 756 networking environment, the computer 702 is connected to the local area network 756 through a wire and/or wireless communication network interface or network adapter 738. The network adapter 738 can facilitate wire and/or wireless communications to the local area network 756, which may also include a wireless access point disposed thereon for communicating with the wireless functionality of the network adapter 738.

When used in a wide area network 754 networking environment, the computer 702 can include a modem 740, or is connected to a communications server on the wide area network 754 or has other means for establishing communications over the wide area network 754, such as by way of the Internet. The modem 740, which can be internal or external and a wire and/or wireless device, connects to the system bus 706 via the input device interface 736. In a networked environment, program modules depicted relative to the computer 702, or portions thereof, can be stored in the remote memory and/or storage device 758. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described herein may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

Figure 8:
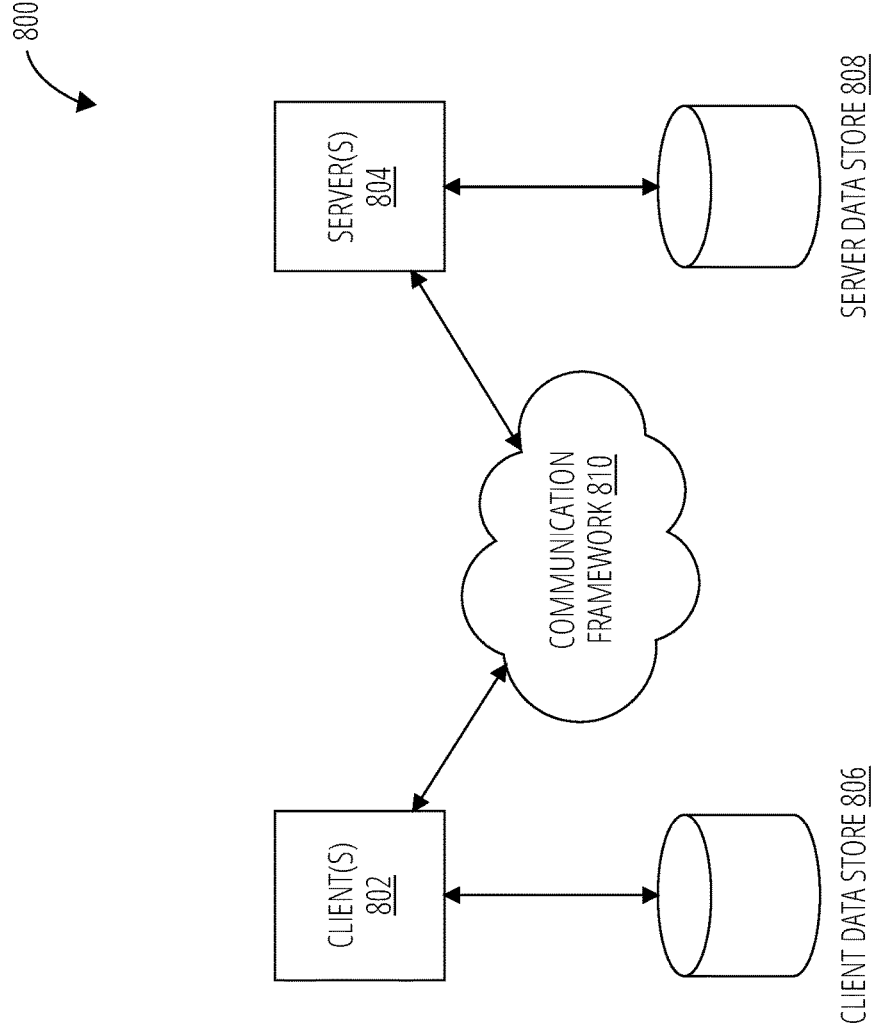
FIG. 8 illustrates a communications architecture 800 in accordance with one embodiment.

FIG. 8 is a block diagram depicting an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800, which may be consistent with systems and devices discussed herein.

As shown in FIG. 8, the communications architecture 800 includes one or more client(s) 802 and server(s) 804. The server(s) 804 may implement one or more functions and embodiments discussed herein. The client(s) 802 and the server(s) 804 are operatively connected to one or more respective client data store 806 and server data store 808 that can be employed to store information local to the respective client(s) 802 and server(s) 804, such as cookies and/or associated contextual information.

The client(s) 802 and the server(s) 804 may communicate information between each other using a communication framework 810. The communication framework 810 may implement any well-known communications techniques and protocols. The communication framework 810 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communication framework 810 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by client(s) 802 and the server(s) 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

What is claimed is:

1. A system to detect vehicle service events in transaction data, comprising:
one or more networking interfaces;
a data store configured to store the vehicle service events for vehicles;
one or more processors coupled with the data store and the one or more networking interfaces; and
memory comprising instructions that, when executed by the one or more processors, cause the one or more processors to:
send an application programming interface (API) get request to the data store for transaction data corresponding to a transaction for a good, a service, or combination thereof;
receive, via the one or more networking interfaces and as a response to the API get request, the transaction data corresponding to a transaction for a good, a service, or combination thereof;
determine, for the transaction using the transaction data, a set of candidate vehicle service event types from a set of vehicle service event types, wherein, to determine the set of candidate vehicle service event types, the one or more processors are further to filter the set of vehicle service event types using a merchant code from the transaction data;
send, via the one or more networking interfaces, a first communication to a device associated with the transaction, the first communication comprising the set of candidate vehicle service event types;
receive, via the one or more networking interfaces, a second communication from the device, the second communication comprising an indication of a vehicle service event having a type selected from the set of candidate vehicle service event types;
determine an identifier to identify a vehicle from the transaction data corresponding to the transaction; and
store, in the data store, the vehicle service event and the transaction data associated with the identifier;
wherein the one or more processors are configured to:
perform an enrollment process to determine the identifier, the vehicle, and data associated with the vehicle;
receive, from a software application on the device, a first request to enroll the vehicle to store the vehicle service events for the vehicle, the first request comprising image data, wherein the software application is configured to initiate a camera of the device to capture the image data and send the image data to the one or more processors to perform optical character recognition on the image data;
perform optical character recognition on the image data to determine the identifier for the vehicle; and
set a monitoring routine to analyze transaction data for one or more accounts associated with the vehicle, the monitoring routine to detect vehicle service events for the vehicle.

2. The system of claim 1, wherein to determine the set of candidate vehicle service event types, the one or more processors are further to filter the set of vehicle service event types based on one or more of a price of the transaction, a location of the transaction, or a combination thereof.

3. The system of claim 1, wherein the transaction data comprises an account number to perform the transaction, and the one or more processors to:
determine from a second data store the device to send the first communication utilizing the account number; and
send the first communication in one of a short message service (SMS) format, a multimedia message service (MMS) format, Extensible Messaging and Presence Protocol (XMPP) format, or real-time communication (RTC) format.

4. The system of claim 1, wherein the one or more processors are further to:
determine from a second data store the device to send the first communication utilizing the merchant code; and
send the first communication in one of a short message service (SMS) format, a multimedia message service (MMS) format, Extensible Messaging and Presence Protocol (XMPP) format, or real-time communication (RTC) format.

5. The system of claim 1, the one or more processors to:
determine a date of a future vehicle service event based on the vehicle service event;
store, in the data store, a reminder to send a user device based on the date;
send the reminder to the user device on a second date, wherein the second date is a number of days before the date, wherein the reminder is sent via an application operating on the user device, wherein the application causes a prompt or alert to display on a user interface of the user device as part of the reminder.

6. The system of claim 1, the one or more processors to:
receive a request for data including vehicle service events for the vehicle from a third-party vehicle history report system, the request including the identifier associated with the vehicle;
retrieve, from the data store, the data comprising the vehicle service events for the vehicle using the identifier; and
communicate the data to the third-party vehicle history report system.

7. The system of claim 1, wherein the one or more processors are further configured to:
receive a request from a reporting system, the request including the identifier for the vehicle and a request for event data regarding the vehicle.

8. The system of claim 1, the one or more processors to perform the enrollment process to:
receive a loan application for a loan to purchase the vehicle, the loan application comprising the identifier, and the data comprising a vehicle make and model, a vehicle year, an amount for the loan, and a name of a loan applicant; and
set a monitoring routine to analyze transaction data for one or more accounts associated with the vehicle, the monitoring routine to detect vehicle service events for the vehicle.

9. The system of claim 7, wherein the one or more processors are further configured to send the vehicle service event, including the vehicle service event type, for the corresponding vehicle associated with the identifier to the reporting system.

10. A computer-implemented method, comprising:
sending an application programming interface (API) get request to a data store for transaction data corresponding to a transaction for a good, a service, or a combination thereof;

receiving, from the data store and as a response to the API get request, the transaction data;

processing the transaction data for the transaction, the transaction data associated with an account enrolled in vehicle service event monitoring;

determining, from the transaction data, the transaction is for a good, a service, or a combination relating to a plurality of vehicle service events;

determining, from the transaction data, candidate vehicle service event types from the plurality of vehicle service events, wherein determining the candidate vehicle service event types includes filtering the plurality of vehicle service events based on a merchant code from the transaction data;

determining, from the transaction data, a device associated with the transaction;

sending a first communication message to the device, the first communication comprising the candidate vehicle service event types;

receiving a second communication message from the device, the second communication comprising an indication of a vehicle service event having a type selected from the candidate vehicle service event types;

determining, from the transaction data, an identifier to identify a vehicle corresponding to the transaction;

storing, in a data store, the vehicle service event type and the transaction data associated with the identifier, the method further comprising:

performing an enrollment process to determine the identifier, the vehicle, and data associated with the vehicle, wherein performing the enrollment process comprises:

receiving, from a banking app on the device, a first request to enroll the vehicle to store the vehicle service events for the vehicle, the first request comprising image data, wherein the banking app is configured to initiate a camera of the device to capture the image data and send the image data to the one or more processors to perform optical character recognition on the image data;

performing an optical character recognition on the image data to determine the identifier for the vehicle; and setting a monitoring routine to analyze transaction data for one or more accounts associated with the vehicle, the monitoring routine to detect vehicle service events for the vehicle.

11. The method of claim 10, wherein determining the candidate vehicle service event types further includes filtering the plurality of vehicle service events based on one or more of a price of the transaction, a location of the transaction, or a combination thereof.

12. The method of claim 10, wherein the transaction data comprises an account number to perform the transaction, and the method comprises:

determining from a second data store the device to send the first communication message utilizing the account number; and sending the first communication message as one of a short message service (SMS) message, a multimedia message service (MMS) message, Extensible Messaging and Presence Protocol (XMPP) message, or real-time communication (RTC) message.

13. The method of claim 10, wherein the method further comprises:

determining from a second data store the device to send the first communication message utilizing the merchant code; and sending the first communication messages as one of a short message service (SMS) message, a multimedia message service (MMS) message, Extensible Messaging and Presence Protocol (XMPP) message, or real-time communication (RTC) message.

14. The method of claim 10, comprising:

determining a date of a future vehicle service event based on the vehicle service event;

storing, in the data store, a reminder to send a user device based on the date; and sending the reminder to the user device on a second date, wherein the second date is a number of days before the date, wherein the reminder is sent via an application operating on the user device, wherein the method further includes the application causing a prompt or alert to display on a user interface of the user device as part of the reminder.

15. The method of claim 10, comprising:

receiving a request for data including vehicle service events for the vehicle from a third-party vehicle history report system, the request including the identifier associated with the vehicle;

retrieving, from the data store, the data comprising the vehicle service events for the vehicle using the identifier; and communicating the data to the third-party vehicle history report system.

16. The method of claim 10, the method further comprising:

receiving a request from a reporting system, the request including the identifier for the vehicle and a request for event data regarding the vehicle.

17. The method of claim 10, wherein performing the enrollment process comprises:

processing a loan application for a loan to purchase the vehicle, the loan application comprising the identifier, and the data comprising a vehicle make and model, a vehicle year, an amount for the loan, and a name of a loan applicant; and setting a monitoring routine to analyze transaction data for one or more accounts associated with the vehicle, the monitoring routine to detect vehicle service events for the vehicle.

18. The method of claim 16, wherein the method further comprises sending the vehicle service event, including the vehicle service event type, for the corresponding vehicle associated with the identifier to the reporting system.

* * * * *